(No Model.)
J. C. MALLISON.
CORN AND COTTON PLANTER COMBINED.
No. 385,940. Patented July 10, 1888.
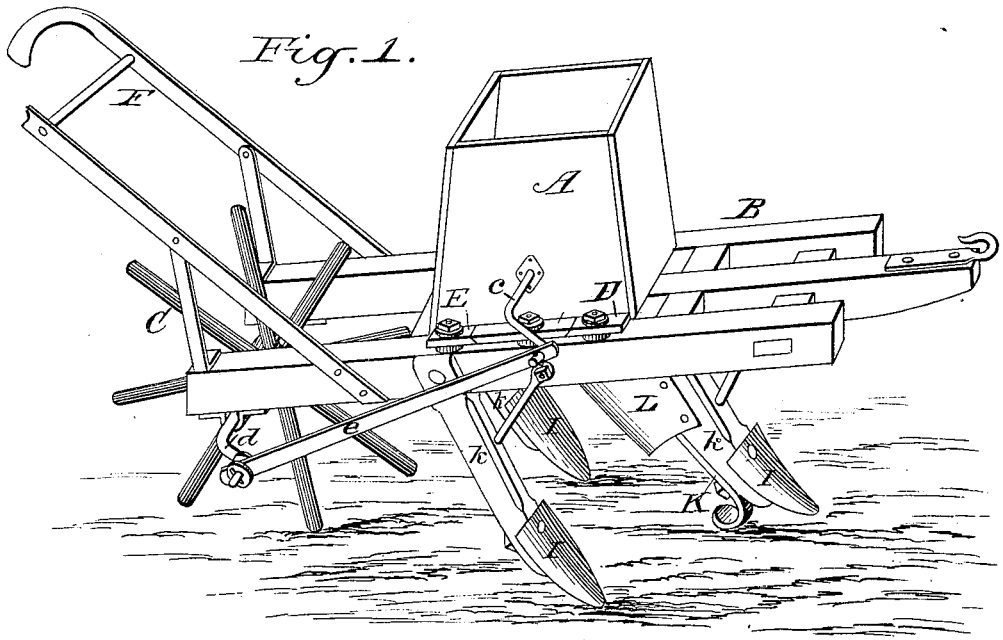
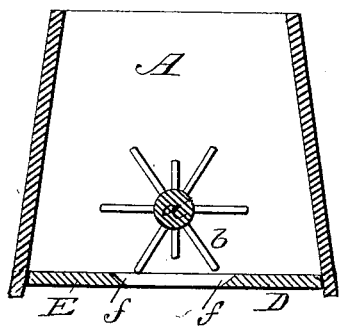
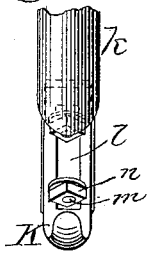
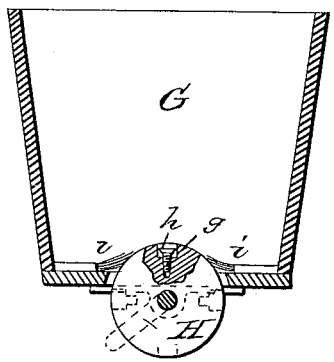
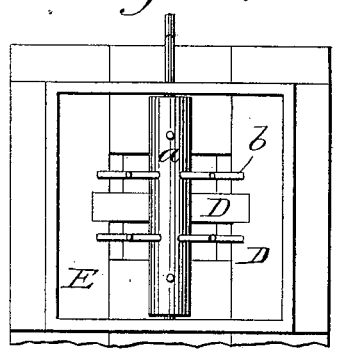
Witnesses:
Jno. J. Scholl.
W. Swinson.
Inventor:
James C. Mallison.
N. PETERS, Photo-Lithographer, Washington, D. C.

UNITED STATES PATENT OFFICE.

JAMES C. MALLISON, OF BRENHAM, TEXAS.

CORN AND COTTON PLANTER COMBINED.

SPECIFICATION forming part of Letters Patent No. 385,940, dated July 10, 1888.

Application filed July 19, 1886. Renewed April 10, 1888. Serial No. 270,197. (No model.)

*To all whom it may concern:*

Be it known that I, JAMES C. MALLISON, a citizen of the United States, residing at the city of Brenham, in the county of Washington and State of Texas, have invented a certain new and useful Corn and Cotton Planter Combined; and I do hereby declare that the following is a full, clear, and exact description of the invention, which will enable others skilled in the art to which it appertains to make and use the same.

The present invention has relation to that class of cotton and corn planters in which are employed hoppers smaller at their top than at their bottom and hoppers larger at their top than at their bottom, to adapt them for planting cotton-seed and corn, respectively.

It is the object of the invention to provide the planter with interchangeable hoppers of the above construction, whereby either can be used upon the same machine, as found desirable, the hopper-seat being especially adapted to receive and hold thereon either one of the hoppers, and admit of their being readily detached and removed therefrom. These objects I attain by the construction substantially as shown in the drawings, and hereinafter described and claimed.

Figure 1 of the drawings is a perspective view of my improved planter; Fig. 2, a sectional view of the hopper adapted for use when planting cotton-seed; Fig. 3, a similar view of a hopper adapted for use when planting corn; Fig. 4, a top plan view of the cotton-seed hopper, and Fig. 5 a detail view of the adjustable hooked gage and plow-standard to which it is connected.

In the accompanying drawings, A represents the hopper, which is adapted for use in planting cotton-seed, said hopper increasing in width as it approaches its base or bottom in order to increase its area of surface to more readily allow the cotton-seed to be fed through the discharge-opening. This hopper is detachably supported on the frame B of the machine, whereby it can be removed and a hopper substituted especially adapted for planting corn, as shown in Fig. 3, and which will be hereinafter described.

The hopper A has a roller, *a*, located therein, and is provided with a series of radial steel-wire teeth, *b*, said roller being operated by a crank-rod, *c*, to which it is attached, and the rod is connected to the crank-axle *d* of the rimless wheel C by means of a pitman, *e*.

The bottom of the seed-box or hopper A consists of two separate sections, D E, which are beveled at their inner edges, as shown at *f*, and may be adjustably connected to the frame B by means of screw-bolts passing through suitable slots in the extremities of the sections and nuts for holding them in their adjusted position, or by any other preferred and well-known means. The adjustability of the bottom sections of the hopper enables the size of the discharge-opening to be increased or diminished, so as to regulate the amount of seed to be dropped, the bottom sections, as well as the hopper, being removable from the frame of the planter.

The hopper G, to be used in the machine when planting corn, is of the usual shape, and contains a distributing-wheel, H, provided with pockets *g* on its rim, the capacity thereof for holding the corn being regulated by means of the screws *h*, and the bottom of the hopper is provided with brushes *i*, for cleaning the periphery of the wheel, as is common in this class of planters.

The frame B of the machine is provided at its rear end with the usual handles, and also has connected to it standards *k*, to which the plows or shovels I are attached. The forward one of the plow-standards has connected to its inner side a curved guide, K, the hook or curve portion extending in a direction toward the rear of the machine and rests upon the soil, the shank of the guide extending up and entering a fender, L. The shank of the gage K has an elongated slot, *l*, and is adjustable on the plow-standard by means of screw-bolt *m* and nut *n*, thereby enabling the gage to be raised or lowered, as described. This gage is intended to regulate the depth of the forward or opening plow and to compel the machine to run and move with smoothness and regularity, the inwardly-curved end enabling it to perform its office with greater effectiveness, and more readily passing over obstructions.

Having now fully described my invention, what I claim as new, and desire to secure by Letters Patent, is—

In a combined cotton and corn planter, the combination, with a pair of interchangeable hoppers, one being larger at the base than at the top and one being larger at the top than at the base, of a plow-frame provided with a hopper-seat adapted to receive either of the hoppers at pleasure, a rotary distributer adapted to regulate the passage of seed through the bottom of the hopper, and a pitman connecting the wrist-pin of a crank on the end of the distributer-shaft with a crank on the end of the drive-wheel shaft, substantially as set forth.

JAMES C. MALLISON.

Witnesses:
BEN S. ROGERS,
B. M. NORMAN.